(12) United States Patent
Thimm et al.

(10) Patent No.: US 8,889,273 B2
(45) Date of Patent: Nov. 18, 2014

(54) CERAMIC MATERIAL WITH A COMPOSITION WHICH IS MATCHED TO A COEFFICIENT OF THERMAL EXPANSION SPECIFIED BY A METALLIC MATERIAL

(75) Inventors: Alfred Thimm, Wunsiedel (DE); Jürgen Ruska, Selb (DE); Johannes Ernst, Naustadt an der Waldnaab (DE); Stefan Stolz, Waldershof (DE)

(73) Assignee: CeramTec GmbH, Plochingen (DE)

( * ) Notice: Subject to any disclaimer, the term of this patent is extended or adjusted under 35 U.S.C. 154(b) by 1181 days.

(21) Appl. No.: 12/594,863

(22) PCT Filed: Apr. 8, 2008

(86) PCT No.: PCT/EP2008/054190
§ 371 (c)(1),
(2), (4) Date: Apr. 28, 2010

(87) PCT Pub. No.: WO2008/128885
PCT Pub. Date: Oct. 30, 2008

(65) Prior Publication Data
US 2010/0233497 A1 Sep. 16, 2010

(30) Foreign Application Priority Data
Apr. 18, 2007 (DE) .......... 10 2007 018 610

(51) Int. Cl.
| | |
|---|---|
| *B32B 9/00* | (2006.01) |
| *B32B 15/04* | (2006.01) |
| *C04B 35/03* | (2006.01) |
| *C04B 35/04* | (2006.01) |
| *C04B 35/053* | (2006.01) |
| *C04B 37/02* | (2006.01) |

(52) U.S. Cl.
CPC .......... *C04B 35/053* (2013.01); *C04B 2237/34* (2013.01); *C04B 2235/6025* (2013.01); *C04B 2235/96* (2013.01); *C04B 2235/77* (2013.01); *C04B 2235/72* (2013.01); *C04B 2235/3244* (2013.01); *C04B 2237/406* (2013.01); *C04B 2237/704* (2013.01); *C04B 2235/9607* (2013.01); *C04B 2235/3225* (2013.01); *C04B 2235/3222* (2013.01); *C04B 2235/3246* (2013.01); *C04B 2235/786* (2013.01); *C04B 2235/5436* (2013.01); *C04B 35/04* (2013.01); *C04B 2237/10* (2013.01); *C04B 37/023* (2013.01); *C04B 2235/3217* (2013.01); *C04B 2235/5445* (2013.01)
USPC ........ 428/702; 428/314.4; 428/432; 428/471; 428/472; 403/28; 501/108; 501/119; 501/120

(58) Field of Classification Search
None
See application file for complete search history.

(56) References Cited

U.S. PATENT DOCUMENTS

| | | | | |
|---|---|---|---|---|
| 5,204,298 | A | * | 4/1993 | Yaoi et al. ............... 501/108 |
| 5,405,562 | A | * | 4/1995 | Kondo et al. .............. 264/44 |
| 6,261,983 | B1 | * | 7/2001 | Gruver ................. 501/120 |
| 6,723,442 | B1 | * | 4/2004 | Decker et al. ............ 428/469 |

FOREIGN PATENT DOCUMENTS

| | | |
|---|---|---|
| AT | 344 061 B | 7/1978 |
| DE | 905 988 C | 3/1954 |
| DE | 41 39 038 A1 | 6/1992 |
| DE | 43 34 683 A1 | 4/1995 |
| GB | 2 283 486 A | 5/1995 |
| JP | 2005-187241 * 7/2005 | ............ C04B 35/053 |

OTHER PUBLICATIONS

Physical Properties of Carbon and Low-Alloy Steels, Properties and Selection: Irons, Steels, and High-Performance Alloys, vol. 1, ASM Handbook, 1990, ASM International, pp. 195-199.*

* cited by examiner

*Primary Examiner* — Gwendolyn Blackwell
*Assistant Examiner* — Seth Dumbris
(74) *Attorney, Agent, or Firm* — Fulbright & Jaworski LLP

(57) ABSTRACT

A non-conductive ceramic material contains a base ceramic material and at least one other ceramic material having a lower coefficient of thermal expansion than that of the base material so that the coefficient of thermal expansion of the non-conductive ceramic material is identical to that of a metallic material to which it will be matched. Methods of making and using same are disclosed.

26 Claims, No Drawings

CERAMIC MATERIAL WITH A COMPOSITION WHICH IS MATCHED TO A COEFFICIENT OF THERMAL EXPANSION SPECIFIED BY A METALLIC MATERIAL

This application is a §371 of PCT/EP2008/054190 filed Apr. 8, 2008, and claims priority from DE 10 2007 018 610.1 filed Apr. 18, 2007.

The invention relates to a non-conductive ceramic material with a composition that is matched in such a way to a coefficient of thermal expansion predetermined by a metallic material to which it is connected in a substance-locking manner that the coefficients of thermal expansion are identical, and also to a method for its production.

Electrically non-conductive ceramic materials are used to isolate electric potentials on account of their high electrical breakdown resistance that can be greater than 15 kV/mm. If, in a manner dependent on use, in order to isolate the electric potentials the ceramic material has to enter into a substance-locking connection with a metal, for example by gluing or soldering, stresses arise in the event of thermal loading on account of the different coefficients of thermal expansion of metal and ceramic material. For example, the coefficient of thermal expansion of aluminium oxide amounts to $7 \cdot 10^{-6}$/K; that of zirconium oxide amounts to $10 \cdot 10^{-6}$/K. The coefficient of thermal expansion of steels, depending on alloying constituents, lies between 9 and $14 \cdot 10^{-6}$/K, that of, for example, standard carbon steels lies at $13 \cdot 10^{-6}$/K, that of soft steel at $12 \cdot 10^{-6}$/K. The connection of the ceramic material to the metal is as a rule effected by means of gluing or soldering, for example with glass solder. Glue or solder cannot, however, compensate for the stresses that arise between the metal and ceramic material in the event of thermal loading. Since as a rule metal expands more than ceramic material, the ceramic material can crack or even chip off. If the ceramic-material layer on the metal becomes damaged as a result of cracks or chips, short circuits result on account of the potential compensation over the defects in the ceramic material.

In theory it is possible to match the coefficient of thermal expansion of a metal to the coefficient of thermal expansion of the ceramic material, which is to be secured to the metal, by means of a corresponding alloy composition. The application and the functional or chemical demands that are dependent thereon do not, however, as a rule allow a change in the material composition of the metal, for example in the case of high-temperature fuel cells. The properties of the ceramic materials with regard to their breakdown resistance, their density, porosity and stability with respect to chemical and mechanical effects must likewise be preserved.

A high-temperature fuel cell having at least one electrically insulating layer that is applied to steel by means of flame-spraying is known from patent specification DE 195 38 034 C1. There are ceramic materials whose electrical insulation properties are good, yet whose adhesion to metal is poor, and other materials whose adhesion to metal is good, yet the electrical insulation properties do not meet the requirements. For this reason, as described in this patent, in the first instance a coat of zirconium oxide with good adhesiveness and then a layer of highly pure aluminium oxide with good electrical insulation properties are sprayed thereon. A layer of an adhesion promoter is required, nevertheless, between the zirconium oxide and the metal. In order to improve the properties, the layers are sprayed on several times in an alternating sequence and the pores are closed by means of an additional coating. Such a method of manufacture is expensive.

An object of the invention is therefore to find a ceramic material whose coefficient of thermal expansion is adjusted to the coefficient of thermal expansion of the metallic material to which it is connected in a substance-locking manner.

The object is achieved with the aid of a ceramic material, as claimed in the first claim, and with a method for producing such a material according to claim 15. Advantageous developments of the invention are claimed in the dependent claims.

An exemplary embodiment of the basic material of the ceramic material in accordance with the invention is magnesium oxide (MgO). The coefficient of thermal expansion of pure magnesium oxide amounts to $14 \cdot 10^{-6}$/K in the range of 20 to 800° C. By means of controlled addition of zirconium oxide ($ZrO_2$) or aluminium oxide ($Al_2O_3$) or a mixture of the same or by means of the addition of $MgAl_2O_4$ in each case a material can be composed whose coefficient of thermal expansion is adapted to the coefficients of thermal expansion of metallic materials, for example of steels. In the event of thermal loading within a predetermined temperature range the properties of the material in accordance with the invention, such as thermal conductivity, coefficient of thermal expansion, bending strength or density, basically are not permitted to change, for example as a result of the sudden formation of new phases. In particular, no percolating, that is, interconnected pores are permitted to arise.

As a result of the material-dependent impurities, in particular of CaO or $SiO_2$, yet also as a result of the controlled addition thereof up to 3% by weight, the sintering temperature of the new material is reduced with respect to that of pure MgO to a range of 1400° C. to 1550° C.

As a result of each impurity or controlled addition of oxidic materials to pure MgO the coefficient of thermal expansion of the MgO is also reduced by up to $0.25 \cdot 10^{-6}$/K per 1% by weight dopant.

There are ceramic materials with whose addition to MgO the coefficient of thermal expansion of MgO drops substantially more quickly than in the case of other materials. If, for example, $Al_2O_3$ is added to MgO, the coefficient of thermal expansion of MgO drops substantially more quickly than when the same quantity of $ZrO_2$ is added. A comparison in the table which follows illustrates this. In each case the quantity of $ZrO_2$ and $Al_2O_3$ that is added as a percentage to supplement MgO to 100% by weight in order to attain the respective coefficient of thermal expansion is specified in % by weight. A production-dependent impurity that lowers the coefficient of thermal expansion of MgO has already been taken into consideration in this table so that the actual coefficient of thermal expansion of the MgO taken at 100% by weight lies at $13.8 \cdot 10^{-6}$/K and the drop starts from there on. With additions of up to 10% by weight $ZrO_2$ or up to 2.5% $Al_2O_3$ a substantially linear interrelationship exists between the addition and the respective drop in the coefficient of thermal expansion of MgO. With the addition of 1% by weight $Al_2O_3$ the coefficient of thermal expansion of MgO drops by $0.2 \cdot 10^{-6}$/K. It is of no significance in this connection whether the MgO has already been contaminated with say 1% by weight $Al_2O_3$ in a manner dependent on production. Since the zirconium oxide has a very high level of purity, approximately 99.9%, its impurities can be disregarded.

TABLE

| Coefficient of thermal expansion $10^{-6}$/K | $ZrO_2$ % by weight | $Al_2O_3$ % by weight |
|---|---|---|
| 13.5 | 5 | 1.25 |
| 13.3 | 10 | 2.5 |
| 13.0 | 17.5 | 4 |

TABLE-continued

| Coefficient of thermal expansion $10^{-6}$/K | $ZrO_2$ % by weight | $Al_2O_3$ % by weight |
|---|---|---|
| 12.5 | 28 | 7.5 |
| 12.0 | 37.5 | 12 |
| 11.5 | 42.5 | 15 |

By combining the specified quantities of $ZrO_2$ and also $Al_2O_3$ added, a respective curve shape can be created according to which it is possible to determine intermediate values of quantities added.

As can be seen from the table, in order to change the coefficient of thermal expansion of MgO roughly, in the first instance $Al_2O_3$ can be added; for fine adjustment $ZrO_2$ is added. This is explained in greater detail with the aid of exemplary embodiments:

A steel with a coefficient of thermal expansion of $13.3 \cdot 10^{-6}$/K is specified. The coefficient of thermal expansion of the ceramic material in accordance with the invention is adjusted to this value,
 a) when with 90% by weight MgO a proportion of 10% by weight $ZrO_2$ is added;
 b) when with 97.5% by weight MgO a proportion of 2.5% by weight $Al_2O_3$ is added;
 c) when with 93.75% by weight MgO a proportion of 1.25% by weight $Al_2O_3$ and a proportion of 5% by weight $ZrO_2$ are added.

The production of the material in accordance with the invention is described in the following with the aid of exemplary embodiments. For example, thin plates, preferably with a thickness of less than 1 mm, are produced from the material. Finely divided powder with a grain size of d50<10 μm is preferably used in this connection. With $ZrO_2$ a monoclinic, finely divided powder with a grain size of d50<1 μm is preferred. The shaping of the green bodies is effected by means of the film-casting method, yet can also be effected by dry-pressing.

The green bodies are sintered in a gas or electrically heated kiln at temperatures of 1500° C. to 1600° C., lying on non-reactive burning plates, for example from sintered magnesia, to a theoretical density of >95%. A sintered magnesia material develops with intercalated $ZrO_2$ when $ZrO_2$ is used, or with a proportion of $MgAl_2O_4$ when $Al_2O_3$ is used, to match the coefficient of thermal expansion of the metallic material.

Ceramic films produced from this material were glued in between two metallic partners by means of glass solder, for example. A composite consisting of a ceramic plate glued between two steel plates of a thickness of 0.4 mm was repeatedly heated in air and in a reducing atmosphere to 900° C. A potential difference of up to 5 V was maintained between the metallic partners. Such a composite remains mechanically stable in the case of changes in temperature in a range of −20° C. to 900° C.

The manufacture of sintered ceramic bodies is explained in greater detail with the aid of the exemplary embodiments, specified under items a), b) and c), of a material composition for matching predetermined coefficients of thermal expansion.

REGARDING EXEMPLARY EMBODIMENT a)

A ceramic slip was produced from 4500 g MgO as a base material with the usual production-dependent impurities, in a grain size of d50=10 μm, electrically melted, and 500 g monoclinic $ZrO_2$ with a grain size of d50=0.5 μm. The weight ratio was therefore 90% MgO (including impurities) to 10% $ZrO_2$. The MgO contained as impurities in percent by weight 0.3% CaO, 0.4% $SiO_2$, 0.5% $Al_2O_3$ and 0.1% further oxides, such as $Fe_2O_3$ and $B_2O_3$.

A mixture of 920 g xylene and 3050 g butanol was used as a solvent, 800 g PVB was used as a binder, 270 g phthalic ester was used as a softener, and 50 g fish oil was used as a dispersing agent. The slip was processed according to the doctor-blade method to form a film which after drying had a thickness of 0.3 mm.

Plates of 200 mm×200 mm were stamped out of the film and sintered at a temperature of 1550° C. in an oxidizing atmosphere, lying on non-reactive burning bases. The sintered plates having a thickness of 0.2 mm were shaped by means of lasers.

During sintering, monoclinic $ZrO_2$ is converted into tetragonal $ZrO_2$ and intercalated into the structure of MgO in an intragranular and intergranular manner. The grain size of the MgO lies between 20 μm and 80 μm; the grain size of the intercalated $ZrO_2$ lies at approximately 5 μm. With this intercalation, the resultant effect, which is known from the $Al_2O_3$—$ZrO_2$ system, is that of reinforcement of the bending strength. The bending strength of pure MgO, which lies between 50 and 70 MPa, is thereby increased to a range of 120 to 150 MPa.

A ceramic shaped portion of the exemplary embodiment had a coefficient of thermal expansion of $13.3 \cdot 10^{-6}$/K in the temperature range between 20° C. and 800° C. and a bending strength of 136 MPa. An SEM investigation showed no open porosity, that is, no percolating pores. The pore size was between 5 μm and 10 μm, and the density 3.6 g/cm³, this corresponding to a theoretical density of 95%. The breakdown strength was over 20 kV/mm.

This shaped portion was connected to a metallic partner with a coefficient of thermal expansion of $13.3 \cdot 10^{-6}$/K by way of a glass solder. The electrical resistance was preserved during thermal cycling in air or in a reducing atmosphere to 850° C.

In the following exemplary embodiment zirconium oxide that has been partially stabilized by yttrium oxide is added. A ceramic slip was produced from 4500 g MgO with the usual production-dependent impurities, in a grain size of d50=10 μm, electrically melted, and 500 g partially stabilized $ZrO_2$ with a content of 5 mol % $Y_2O_3$ and a grain size of d50=1.0 μm. The weight ratio was therefore 90% MgO (including impurities) to 10% $ZrO_2$. The MgO contained as impurities in percent by weight 0.3% CaO, 0.4% $SiO_2$, 0.5% $Al_2O_3$ and 0.1% further oxides, such as $Fe_2O_3$ and $B_2O_3$. Apart from the structure-stabilizing $Y_2O_3$ in the $ZrO_2$, all the constituents lower the coefficient of thermal expansion.

A mixture of 920 g xylene and 3050 g butanol was used as a solvent, 800 g PVB was used as a binder, 270 g phthalic ester was used as a softener, and 50 g fish oil was used as a dispersing agent. The slip was processed according to the doctor-blade method to form a film which after drying had a thickness of 0.3 mm.

The method run corresponded to that of the preceding exemplary embodiment.

A ceramic shaped portion of the exemplary embodiment had a coefficient of thermal expansion of $13.3 \cdot 10^{-6}$/K in the temperature range between 20° C. and 800° C. and a bending strength of 131 MPa. An SEM investigation showed no open porosity. The pore size was between 5 μm and 10 μm, and the density 3.53 g/cm³, this corresponding to a theoretical density of 94%. The breakdown strength was over 20 kV/mm.

REGARDING EXEMPLARY EMBODIMENT b)

A ceramic slip was produced from 4500 g MgO as a base material with the usual production-dependent impurities, in a grain size of d50=10 μm, electrically melted, and 112.5 g $Al_2O_3$ with a grain size of d50=2.0 μm. The weight ratio was therefore 97.5% MgO (including impurities) to 2.5 $Al_2O_3$. The MgO contained as impurities in percent by weight 0.3% CaO, 0.4% $SiO_2$, 0.5% $Al_2O_3$ and 0.1% further oxides, such as $Fe_2O_3$ and $B_2O_3$.

A mixture of 920 g xylene and 3050 g butanol was used as a solvent, 800 g PVB was used as a binder, 270 g phthalic ester was used as a softener, and 50 g fish oil was used as a dispersing agent. The slip was processed according to the doctor-blade method to form a film which after drying had a thickness of 0.3 mm.

Plates of 200 mm×200 mm were stamped out of the film and sintered at a temperature of 1550° C. in an oxidizing atmosphere and in the same sintering conditions as in Example a), lying on non-reactive burning plates. The sintered plates having a thickness of 0.2 mm were shaped by means of lasers.

A ceramic shaped portion of the exemplary embodiment had a coefficient of thermal expansion of $13.3 \cdot 10^{-6}$/K in the temperature range between 20° C. and 800° C. and a bending strength of 110 MPa, closed pores with a pore size between 5 μm and 10 μm, and the density at 3.36 g/cm$^3$, this corresponding to a theoretical density of over 95%. The breakdown strength was over 20 kV/mm.

Instead of pure $Al_2O_3$, in order to control the coefficient of thermal expansion it is also possible to add the equivalent quantity of $MgAl_2O_4$ to the MgO. 1% by weight $MgAl_2O_4$ then corresponds to 0.72% by weight $Al_2O_3$. In order to attain the coefficient of thermal expansion of $13.3 \cdot 10^{-6}$/K of steel, the substance mixture consists of 96.55% by weight MgO and 3.45% by weight $MgAl_2O_4$. The method runs and the result of sintering correspond to those in Exemplary Embodiment b).

REGARDING EXEMPLARY EMBODIMENT c)

A ceramic slip was produced from 4500 g MgO as a base material with the usual production-dependent impurities, in a grain size of d50=10 μm, electrically melted, and 60.0 g $Al_2O_3$ with a grain size of d50=2.0 μm, and 240 g monoclinic $ZrO_2$ with a grain size of d50=0.5 μm. The weight ratio was therefore 93.75% MgO (including impurities) to 1.25% $Al_2O_3$ and 5% $ZrO_2$. The MgO contained as impurities in percent by weight 0.3% CaO, 0.4% $SiO_2$, 0.5% $Al_2O_3$ and 0.1% further oxides, such as $Fe_2O_3$ and $B_2O_3$.

A mixture of 920 g xylene and 3050 g butanol was used as a solvent, 800 g PVB was used as a binder, 270 g phthalic ester was used as a softener, and 50 g fish oil was used as a dispersing agent. The slip was processed according to the doctor-blade method to form a film which after drying had a thickness of 0.3 mm.

Plates of 200 mm×200 mm were stamped out of the film and sintered at a temperature of 1550° C. in an oxidizing atmosphere, lying on non-reactive burning plates. The sintered plates having a thickness of 0.2 mm were shaped by means of lasers.

A ceramic shaped portion of the exemplary embodiment had a coefficient of thermal expansion of $13.3 \cdot 10^{-6}$/K in the temperature range between 20° C. and 800° C. and a bending strength of 115 MPa, closed pores with a pore size between 5 μm and 10 μm, a density of 3.5 g/cm$^3$, this corresponding to a theoretical density of 94%, and exhibited a breakdown strength of over 20 kV/mm.

Instead of films, it is also possible to produce shaped bodies, in which case the production can be effected according to the dry-pressing method.

The invention claimed is:

1. A non-conductive sintered ceramic body with a composition that is matched in such a way to a predetermined coefficient of thermal expansion of a metallic material to which it is connected in a substance-locking manner that the coefficients of thermal expansion are identical, comprising MgO as a ceramic base material having a high coefficient of thermal expansion and $Al_2O_3$ or $ZrO_2$ or both as another ceramic material that has a lower coefficient of thermal expansion than the ceramic base material in such a quantity that the coefficient of thermal expansion of the non-conductive sintered ceramic body is identical with the coefficient of thermal expansion of the metallic material, and wherein the non-conductive sintered ceramic body has a bending strength ranging from 110-150 MPa.

2. A non-conductive sintered ceramic body according to claim 1, prepared by matching a first ceramic material with an effect that lowers the coefficient of thermal expansion of the base ceramic material having a high coefficient of thermal expansion to approximately the predetermined coefficient of thermal expansion and by adding a second ceramic material with an effect that lowers the coefficient of thermal expansion to a lesser extent then the first ceramic material for precise adjustment to the predetermined coefficient of thermal expansion.

3. A non-conductive sintered ceramic body according to claim 1, wherein the base material is magnesium oxide to which such a quantity of zirconium oxide is added that the material produced therefrom has a coefficient of thermal expansion that corresponds to the metallic material to which it is connected in a substance-locking manner.

4. A non-conductive sintered ceramic body according to claim 3, wherein the metallic material is a steel alloy, the coefficient of thermal expansion of the steel amounts to $13.3 \cdot 10^{-6}$/K, and the non-conductive ceramic material connected to a steel plate is sintered from a substance mixture of 90% by weight magnesium oxide, with dopants included therein or impurities of up to 3% by weight and as a result an impurity-dependent coefficient of thermal expansion of $13.8 \cdot 10^{-6}$/K, and 10% by weight zirconium oxide.

5. A non-conductive sintered ceramic body according to claim 4 having a bending strength of 136 MPa, closed pores with a pore size between 5 μm and 10 μm, a density of 3.6 g/cm$^3$, this corresponding to a theoretical density of 95%, and a breakdown strength of over 20 kV/mm.

6. A non-conductive sintered ceramic body according to claim 1, wherein the ceramic base material is magnesium oxide to which such a quantity of aluminum oxide is added such that the material produced therefrom has a coefficient of thermal expansion that corresponds to the metallic material to which it is connected in a substance-locking manner.

7. A non-conductive sintered ceramic body according to claim 6, wherein the metallic material is a steel alloy, the coefficient of thermal expansion of the steel amounts to $13.3 \cdot 10^{-6}$/K, and the non-conductive ceramic material connected to a steel plate is sintered from a substance mixture of 97.5% by weight magnesium oxide, with dopants included therein or impurities of up to 3% by weight and as a result an impurity-dependent coefficient of thermal expansion of $13.8 \cdot 10^{-6}$/K, and 2.5% by weight aluminum oxide.

8. A non-conductive sintered ceramic body according to claim 7 having a bending strength of 110 MPa, closed pores with a pore size between 5 μm and 10 μm, a density of 3.36 g/cm$^3$, this corresponding to a theoretical density of over 95%, and a breakdown strength of over 20 kV/mm.

9. A non-conductive sintered ceramic body according to claim 1, wherein the base material is magnesium oxide to which such a quantity of zirconium oxide and aluminum oxide is added that the material produced therefrom has a coefficient of thermal expansion that corresponds to the metallic material to which it is connected in a substance-locking manner.

10. A non-conductive sintered ceramic body according to claim 9, wherein the metallic material is steel having a coefficient of thermal expansion of the steel amounts to $13.3 \cdot 10^{-6}$/K, and the non-conductive ceramic material connected to a steel plate is sintered from a substance mixture of 93.75% by weight magnesium oxide, with dopants included therein or impurities of up to 3% by weight and as a result an impurity-dependent coefficient of thermal expansion of $13.8 \cdot 10^{-6}$/K, and 1.25% by weight aluminum oxide and also 5% by weight zirconium oxide.

11. A non-conductive sintered ceramic body according to claim 10 having a bending strength of 115 MPa, closed pores with a pore size between 5 μm and 10 μm, a density of 3.5 g/cm$^3$, this corresponding to a theoretical density of 94%, and a breakdown strength of over 20 kV/mm.

12. A non-conductive sintered ceramic body according to claim 1, wherein the base material further comprises a quantity of $MgAl_2O_4$ such that the material produced therefrom has a coefficient of thermal expansion that corresponds to the metallic material to which it is connected in a substance-locking manner.

13. A method for producing a non-conductive sintered ceramic of claim 1 comprising producing a sintered non-conductive ceramic with a composition that is matched in such a way to a coefficient of thermal expansion of a metallic material to which the ceramic material is connected in a substance-locking manner that the coefficients of thermal expansion are identical by adding to a ceramic base material with a coefficient of thermal expansion a proportion of at least another ceramic material that has a lower coefficient of thermal expansion to that of the ceramic base material, wherein the ceramic base material comprises MgO and the lower thermal expansion materials are $Al_2O_3$, $ZrO_2$, or both.

14. A method according to claim 13, wherein a ceramic material with a high coefficient of thermal expansion is matched to a predetermined coefficient of thermal expansion by adding to it in the first instance a first ceramic material with an effect that lowers the coefficient of thermal expansion greatly for rough approximation to the predetermined coefficient of thermal expansion and then a second ceramic material with an effect that lowers the coefficient of thermal expansion to a lesser extent for precise adjustment to the predetermined coefficient of thermal expansion.

15. A method according to claim 14, wherein the at least one other ceramic material comprises zirconium oxide.

16. A method according to claim 13, wherein the base material is magnesium oxide which contains production-dependent impurities, and wherein the at least one other ceramic material is zirconium oxide, and further comprising forming a metallic green body that is sintered at a temperature of 1550° C. in an oxidizing atmosphere to form a sintered body of a material with closed pores.

17. A method according to claim 15, wherein the metallic material is a steel alloy, the coefficient of thermal expansion of the steel amounts to $13.3 \cdot 10^{-6}$/K, and the material of the ceramic body connected to a steel plate is sintered from a substance mixture of 90% by weight magnesium oxide, with an impurity-dependent coefficient of thermal expansion of $13.8 \cdot 10^{-6}$/K, and 10% by weight zirconium oxide.

18. A method according to claim 14, wherein such a quantity of aluminum oxide is added to a base material magnesium oxide, wherein the material produced therefrom has a coefficient of thermal expansion that corresponds to the metallic material to which it is connected in a substance-locking manner.

19. A method according to claim 18, wherein from the base material magnesium oxide, at least with the production-dependent usual impurities, and with the quantity of aluminum oxide that is to be added for the match to the predetermined coefficient of thermal expansion of the metallic material, a green body is produced that is sintered at a temperature of 1550° C. in an oxidizing atmosphere to form a sintered body of a material with closed pores.

20. A method according to claim 18, wherein the metallic material is a steel alloy, the coefficient of thermal expansion of the steel amounts to $13.3 \cdot 10^{-6}$/K, and the material of the ceramic body connected to a steel plate is sintered from a substance mixture of 97.5% by weight magnesium oxide, with an impurity-dependent coefficient of thermal expansion of $13.8 \cdot 10^{-6}$/K, and 2.5% by weight aluminum oxide.

21. A method according to claim 14, wherein the at least one other ceramic material comprises quantity of zirconium oxide and aluminum oxide.

22. A method according to claim 21, further comprising producing a green body with the mixture and sintering the green body at a temperature of 1550° C. in an oxidizing atmosphere to form a sintered body of a material with closed pores.

23. A method according to claim 21, wherein the metallic material is a steel alloy, the coefficient of thermal expansion of the steel amounts to $13.3 \cdot 10^{-6}$/K, and the material of the ceramic body connected to a steel plate is sintered from a substance mixture of 93.75% by weight magnesium oxide, with an impurity-dependent coefficient of thermal expansion of $13.8 \cdot 10^{-6}$/K, 1.25% by weight aluminum oxide and 5% by weight zirconium oxide.

24. A method according to claim 14, wherein a $MgAl_2O_4$ is added to the base material.

25. A method according to claim 24, wherein from the base material magnesium oxide, at least with the production-dependent usual impurities, with the quantity of $MgAl_2O_4$ that is to be added for the match to the predetermined coefficient of thermal expansion of the metallic material, a green body is produced that is sintered at a temperature of 1550° C. in an oxidizing atmosphere to form a sintered body of a material with closed pores.

26. A method according to claim 25, wherein the metallic material is a steel alloy, the coefficient of thermal expansion of the steel amounts to $13.3 \cdot 10^{-6}$/K, and the material of the ceramic body connected to a steel plate is sintered from a substance mixture of 96.55% by weight magnesium oxide, with an impurity-dependent coefficient of thermal expansion of $13.8 \cdot 10^{-6}$/K, and 3.45% by weight $MgAl_2O_4$.

* * * * *